United States Patent [19]

Gellert

[11] Patent Number: 5,792,493
[45] Date of Patent: Aug. 11, 1998

[54] CONNECTOR BUSHING FOR INJECTION MOLDING MANIFOLDS

[76] Inventor: Jobst Ulrich Gellert, 7A Prince St., Georgetown, Ontario, Canada, L7G 2X1

[21] Appl. No.: 872,005

[22] Filed: Jun. 9, 1997

[30] Foreign Application Priority Data

May 23, 1997 [CA] Canada ..................... 2205978

[51] Int. Cl.⁶ ..................................... B29C 45/22
[52] U.S. Cl. ............... 425/567; 264/297.2; 264/328.8; 425/572; 425/588
[58] Field of Search ..................... 425/549, 570, 425/572, 588, 567; 264/297.2, 328.8

[56] References Cited

U.S. PATENT DOCUMENTS 4,761,343   8/1988   Gellert ..................... 425/588
5,720,995   2/1998   Gellert ..................... 425/572

*Primary Examiner*—Tim Heitbrink
*Attorney, Agent, or Firm*—Dalesman & Company

[57] ABSTRACT

Multi-cavity injection molding apparatus having several melt distribution manifolds interconnected by elongated connector bushings. Each connector bushing has an outer sleeve which fits over a nonthreaded cylindrical portion of the main body. The main body is made of a material such as steel with sufficient strength that thermal expansion pushes the manifolds into operating positions slightly further apart without damaging the connector bushings. The outer sleeve of each connector bushing is made of a material such as copper having a coefficient of expansion sufficiently greater than the main body whereby thermal expansion results in the connector bushing forming a seal against melt leakage.

7 Claims, 2 Drawing Sheets

1

CONNECTOR BUSHING FOR INJECTION MOLDING MANIFOLDS

BACKGROUND OF THE INVENTION

This invention relates generally to multi-cavity injection molding and more particularly to apparatus wherein a melt conveying connector bushing having an outer sleeve made of a different material than the main body of the connector bushing extends between two heated manifolds.

As seen in the applicant's Canadian Patent Application Ser. No. 2,180,603 entitled "Injection Molding Manifolds with Melt Connector Bushing" filed Jul. 5, 1996, connector bushings having a threaded end and a nonthreaded end extending between two heated manifolds is already known. These previous connector bushings were made of a material such as a beryllium copper alloy having a relatively high coefficient of expansion so that the nonthreaded portion expanded to form a seal in the manifold when the apparatus is heated to the operating temperature. However, as the manifolds and the connector bushing expand due to the heating, the connector bushing has to push the two manifolds slightly further apart, and it has been found in some cases that the connector bushing does not have sufficient strength and is deformed by the thermal expansion forces.

SUMMARY OF THE INVENTION

Accordingly, it is an object of the present invention to at least partially overcome the disadvantages of the prior art by providing an elongated manifold connector bushing having the combination of a main body formed of a material having sufficient strength to avoid deformation and an outer sleeve having a higher coefficient of expansion to form a seal around the connector bushing when heated to the operating temperature.

To this end, in one of its aspects, the invention provides multi-cavity injection molding apparatus having two spaced heated manifolds interconnected by an elongated connector bushing. The heated manifolds and the connector bushing are mounted in a mold with a melt passage extending from one of the heated manifolds through the connector bushing into the other heated manifold. The connector bushing has an elongated main body with a threaded cylindrical portion extending from one end, a nonthreaded cylindrical portion extending from the other end, and a melt bore extending therethrough. The threaded cylindrical portion is received in a threaded cylindrical opening aligned with a melt passage in one of the heated manifolds, the nonthreaded cylindrical portion is received in a nonthreaded cylindrical opening aligned with the melt passage in the other heated manifold. The nonthreaded cylindrical opening in the other heated manifold has an inner end formed by a circular shoulder extending inwardly to the melt passage. One of the main body of the connector bushing abuts against the circular shoulder at the inner end of the nonthreaded cylindrical opening. The connector bushing has a cylindrical outer sleeve which fits around the nonthreaded cylindrical portion of the main body and in the nonthreaded opening in the other heated manifold. The elongated main body of the connector bushing is made of a material having sufficient strength to push the two manifolds further apart due to thermal expansion as the manifolds and the connector bushing are heated to a predetermined operating temperature. The cylindrical outer sleeve is made of a material having a sufficient coefficient of expansion to expand to form a seal to prevent melt leakage around the nonthreaded cylindrical portion as the manifolds and the connector bushing are heated to the operating temperature.

Further objects and advantages of the invention will appear from the following description taken together with the accompanying drawings.

DETAILED DESCRIPTION OF THE INVENTION

Figure 1:
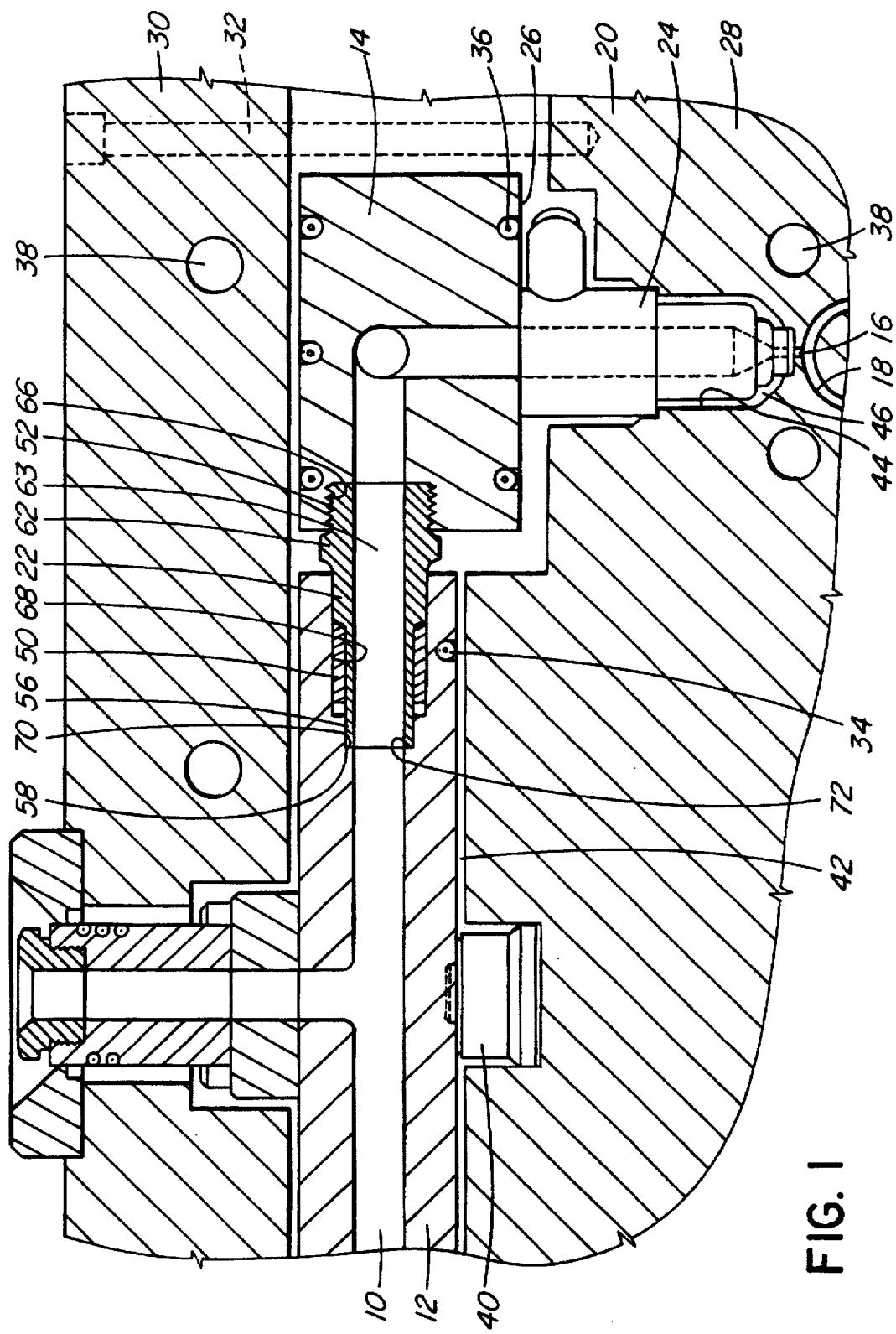
FIG. 1 is a sectional view of a portion of a multi-cavity injection molding system showing apparatus according to a preferred embodiment of the invention.

Reference is first made to FIG. 1 which shows a portion of a multi-gate injection molding system or apparatus having a melt passage 10 which branches in a central melt distribution manifold 12 and again in nozzle manifolds 14 to convey pressurized melt from a molding machine (not shown) to several gates 16 leading to cavities 18 in a mold 20. The melt passage 10 extends through a connector bushing 22 extending between the central manifold 12 and each nozzle manifold 14 according to the invention and then through heated nozzles 24 extending from the front face 26 of each nozzle manifold in alignment with each of the gates 16. While the mold 20 usually has a greater number of plates depending upon the application, in this case, only a cavity plate 28 and a back plate 30 which are secured together by screws 32 are shown for ease of illustration. The central manifold 12 and the nozzle manifold 14 are heated by integral electrical heating elements 34, 36 and the mold 20 is cooled by pumping cooling water through cooling conduits 38. The central melt distribution manifold 12 is mounted between the cavity plate 28 and the back plate 30 by a central locating ring 40 with an insulative air space 42 between the heated manifolds 12, 14 and the surrounding cooled mold 20. Each heated nozzle 24 is seated in a well 44 in the cavity plate 28 with a similar insulative air space 46 between the heated nozzle 24 and the surrounding cooled mold 20.

Figure 2:
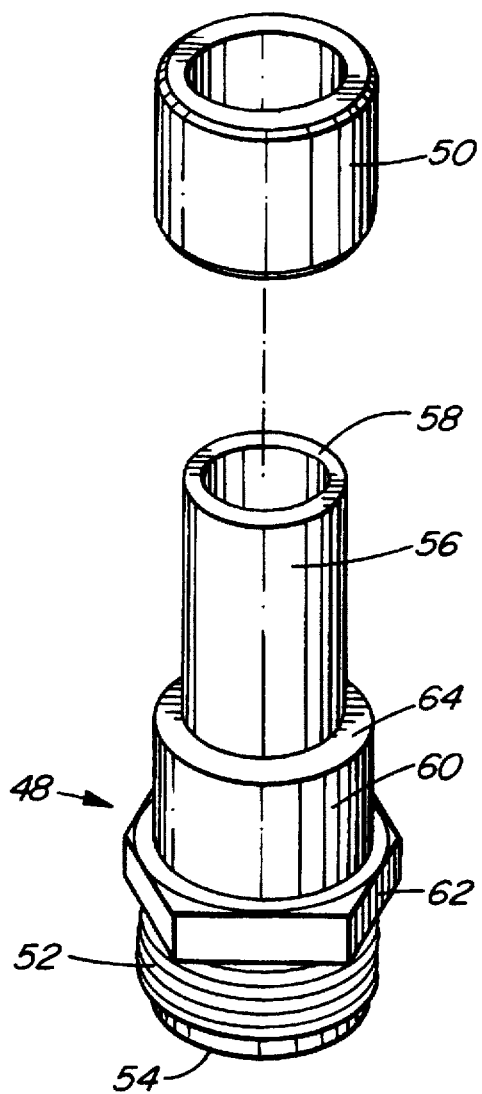
FIG. 2 is an exploded isometric view of the connector bushing shown in FIG. 1 with the outer sleeve in position for mounting on the main body.
Figure 3:
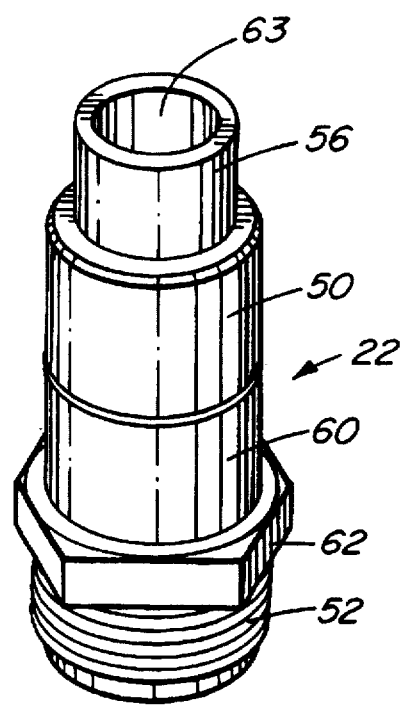
FIG. 3 is an isometric view of the same connector bushing with the outer sleeve mounted in place.

Referring also to FIGS. 2 and 3, the connector bushing 22 has an elongated main body 48 and a cylindrical outer sleeve 50. The main body 48 of the connector bushing 22 has a threaded cylindrical portion 52 extending from one end 54, a nonthreaded cylindrical portion 56 extending from the other end 58, and an intermediate portion 60 with a hexagonal flange 62 extending outwardly between the threaded and nonthreaded cylindrical portions 52, 56 and a central bore 63 through which the melt passage 10 extends. The cylindrical outer sleeve 50 fits around the nonthreaded cylindrical portion 56 of the main body 48 and abuts against a circular shoulder 64 formed by the intermediate portion 60 of the main body 48. The cylindrical outer sleeve 50 is shorter than the nonthreaded cylindrical portion 56 of the main body 48 and is formed of a material such as copper or a copper alloy having a higher coefficient of expansion higher than that of the main body which is formed of a high strength material such as steel. The cylindrical outer sleeve 50 is mounted securely in place around the nonthreaded cylindrical portion 56 of the main body 48 by first cooling the main body 48 in dry ice and then slipping the cylindrical outer sleeve 50 into place around the nonthreaded cylindrical portion 56.

Referring now to FIG. 1, the connector bushing 22 is mounted in place with the threaded cylindrical portion 52 of the main body 48 screwed tightly into place in a threaded cylindrical opening 66 in the nozzle manifold 14 and the nonthreaded cylindrical portion 56 of the main body 48 with the surrounding outer sleeve 50 fitting in a matching nonthreaded opening 68 in the central manifold 12. Of course, in other embodiments, the connector bushings 22 can be reversed with the threaded cylindrical openings 66 in the central manifold 12 and the nonthreaded opening 68 in the nozzle manifolds 14. The nonthreaded end 58 of the main body 48 of the connector bushing 22 abuts against a circular shoulder 70 at the inner end 72 of the nonthreaded opening 68 in the central manifold 12.

In use, usually two nozzle manifolds 14 extending in opposite directions from the central manifold 12 are mounted in the mold 20 as shown in FIG. 1. The mold 20 is cooled in a conventional manner by pumping cooling water through the cooling conduits 38. Electrical power is applied to the heating elements 34, 36 to heat the melt distribution manifolds 12, 14 and the connector bushings 22 to a desired operating temperature. As they expand, the nonthreaded end 58 of the main body 48 of each connector bushing 22 pushes against the circular shoulder 70 at the inner end 72 of the nonthreaded opening 68 in which it is received. As the central manifold 12 is centrally located in the mold 20 by the central locating ring 40, this moves the nozzle manifolds 14 into operating positions slightly further apart from the central manifold to accommodate this thermal expansion. The main body 48 of each connector bushing is made of a high strength material such as steel to avoid deformation due to the very high forces generated by this thermal expansion. Also, as the central manifold 12 and the connector bushings 22 are heated, the outer sleeve 50 expands sufficiently to provide a seal against melt leakage through or around the connector bushings 22. In this embodiment, each outer sleeve 50 is made of copper which has a coefficient of expansion sufficiently greater than that of the steel of which the main body 48 of the connector bushing 22 and the surrounding central manifold 12 are made to allow the nonthreaded portion 56 of the connector bushing 22 with the outer sleeve 50 mounted around it to be inserted into the nonthreaded opening 68 in the central manifold before heating and have the outer sleeve 50 expand sufficiently during heating to the operating temperature to form the melt leakage seal. Pressurized melt from the molding machine (not shown) then flows through the melt passage 10 to fill the cavities 18 according to a conventional injection cycle.

While the description of the injection molding apparatus with connector bushings having an outer sleeve formed of a different material than the main body has been given with respect to a preferred embodiment, it will be evident that various modifications are possible without departing from the scope of the invention as understood by those skilled in the art.

The embodiments of the invention in which an exclusive property or privilege is claimed is defined as follows:

1. In a multi-cavity injection molding apparatus having spaced first and second heated manifolds interconnected by an elongated connector bushing, the first and second heated manifolds and the connector bushing mounted in a mold with a melt passage extending from the first heated manifold through the connector bushing into the second heated manifold, the connector bushing having an elongated main body with a first end, a second end, a nonthreaded cylindrical portion extending from the first end, a threaded cylindrical portion extending from the second end, and a melt bore extending therethrough between the first and second ends, the threaded cylindrical portion being received in a threaded cylindrical opening aligned with a melt passage in the second heated manifold, the nonthreaded cylindrical portion being received in a nonthreaded opening aligned with the melt passage in the first heated manifold, the nonthreaded opening in the first heated manifold having an inner end comprising a circular shoulder extending inwardly to the melt passage, the improvement wherein;

the first end of the main body of the connector bushing abuts against the circular shoulder at the inner end of the nonthreaded opening in the first heated manifold, the connector bushing has a cylindrical outer sleeve which fits around the nonthreaded cylindrical portion of the main body and in the nonthreaded opening in the first heated manifold, the elongated main body of the connector bushing is made of a material having sufficient strength to push the first and second manifolds further apart due to thermal expansion as the first and second manifolds and the connector bushing are heated to a predetermined operating temperature, and the cylindrical outer sleeve is made of a material having a sufficient coefficient of expansion to expand to form a seal to prevent melt leakage around the nonthreaded cylindrical portion as the first and second manifolds and the connector bushing are heated to the operating temperature.

2. Injection molding apparatus as claimed in claim 1 wherein the elongated main body of the connector bushing has an intermediate portion extending between the threaded cylindrical portion and the nonthreaded cylindrical portion, the intermediate portion having an inwardly extending circular shoulder from which the nonthreaded cylindrical portion extends and against which the cylindrical sleeve abuts.

3. Injection molding apparatus as claimed in claim 2 wherein the intermediate portion of the connector bushing has engagement means to receive a tool to rotate the connector bushing for insertion and removal.

4. Injection molding apparatus as claimed in claim 3 wherein the outer sleeve is shorter than the nonthreaded cylindrical portion of the main body.

5. Injection molding apparatus as claimed in claim 4 wherein the engagement means is a hexagonal shaped flange extending around the intermediate portion of the connector bushing between the threaded portion and the nonthreaded portion.

6. Injection molding apparatus as claimed in claim 1 wherein the main body of the connector bushing is made of steel.

7. Injection molding apparatus as claimed in claim 1 wherein the cylindrical sleeve is made of copper.

* * * * *